(12) United States Patent
Isoyama et al.

(10) Patent No.: US 12,271,483 B2
(45) Date of Patent: Apr. 8, 2025

(54) EVALUATION APPARATUS, EVALUATION SYSTEM, EVALUATION METHOD, AND PROGRAM

(71) Applicant: NEC Corporation, Tokyo (JP)

(72) Inventors: Kazuhiko Isoyama, Tokyo (JP); Yoshiaki Sakae, Tokyo (JP); Jun Nishioka, Tokyo (JP); Yuji Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 268 days.

(21) Appl. No.: 17/767,127

(22) PCT Filed: Oct. 25, 2019

(86) PCT No.: PCT/JP2019/041928
§ 371 (c)(1),
(2) Date: Apr. 7, 2022

(87) PCT Pub. No.: WO2021/079495
PCT Pub. Date: Apr. 29, 2021

(65) Prior Publication Data
US 2022/0374528 A1    Nov. 24, 2022

(51) Int. Cl.
*G06F 21/00*  (2013.01)
*G06F 21/57*  (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | |
|---|---|---|---|
| 2005/0262522 A1* | 11/2005 | Gassoway | G06F 9/4484 712/E9.082 |
| 2012/0137369 A1* | 5/2012 | Shin | G06F 21/577 726/25 |

(Continued)

FOREIGN PATENT DOCUMENTS

| | | | | |
|---|---|---|---|---|
| CN | 109154966 A | * | 1/2019 | .......... G06F 11/3604 |
| JP | 2009217637 A | * | 9/2009 | |

(Continued)

OTHER PUBLICATIONS

International Search Report for PCT Application No. PCT/JP2019/041928, mailed on Jan. 28, 2020.

(Continued)

*Primary Examiner* — Rodman Alexander Mahmoudi

(57) ABSTRACT

In order to provide an evaluation apparatus that appropriately evaluates a risk from continuous execution of an application without stopping execution of the application, an evaluation apparatus includes a first obtaining section, an evaluating section, and an output section. The first obtaining section is configured to obtain application information related to an application being executed on a server. The evaluating section is configured to evaluate a risk degree from continuous execution of the application on the server, based on the application information. The output section is configured to output an evaluation result of the risk degree.

5 Claims, 20 Drawing Sheets

(56) References Cited

U.S. PATENT DOCUMENTS

| | | | | |
|---|---|---|---|---|
| 2013/0054960 | A1* | 2/2013 | Grab | H04L 63/0884 |
| | | | | 726/17 |
| 2015/0289207 | A1* | 10/2015 | Kubo | H04W 4/029 |
| | | | | 370/311 |
| 2016/0259944 | A1 | 9/2016 | Okihara | |
| 2017/0372072 | A1 | 12/2017 | Baset et al. | |
| 2019/0079734 | A1* | 3/2019 | Kadam | G06F 8/71 |
| 2020/0042715 | A1* | 2/2020 | Davidi | G06F 21/572 |

FOREIGN PATENT DOCUMENTS

| | | | |
|---|---|---|---|
| JP | 2010-067216 A | | 3/2010 |
| JP | 2010-117887 A | | 5/2010 |
| JP | 2016513324 A | * | 5/2016 |
| JP | 2016-162233 A | | 9/2016 |
| JP | 2017-224053 A | | 12/2017 |
| JP | 2019-525287 A | | 9/2019 |
| WO | 2012/132125 A1 | | 10/2012 |

OTHER PUBLICATIONS

English translation of Written opinion for PCT Application No. PCT/JP2019/041928, mailed on Jan. 28, 2020.

* cited by examiner

VULNERABILITY INFORMATION

| NAME | IDENTIFIER | VULNERABILITY DETAIL INFORMATION |
|------|------------|----------------------------------|
|      |            |                                  |

Fig.5

| TYPE | CONTENTS |
|---|---|
| Type1 | ANY CODE CAN BE EXECUTED |
| Type2 | UNAUTHORIZED PRIVILEGE ESCALATION CAN BE CARRIED OUT |
| Type3 | UNAUTHORIZED MEMORY ACCESS CAN BE CARRIED OUT |
| Type4 | THERE IS SECURITY HOLE IN SPECIFIC PORT NUMBER |
| Type5 | ACCESS TO FILE IS NOT RESTRICTED |
| ⋮ | ⋮ |

| NAME | IDENTIFIER | TYPE | CONTENTS |
|---|---|---|---|
| APPLICATION A1 | V1.1 | Type1 | ANY CODE CAN BE EXECUTED UNDER SPECIFIC CONDITION |

VULNERABILITY INFORMATION (APPLICATION)

Fig.7B

| LIBRARY L1 | V2.2 | Type4 | F5 | THERE IS SECURITY HOLE IN PORT NUMBER x1 |
|---|---|---|---|---|
| NAME | IDENTIFIER | TYPE | DEFECT FUNCTION | VULNERABILITY INFORMATION SUBINFO |

CONTENTS

| VULNERABILITY TYPE | RISK LEVEL |
|---|---|
| Type1 | Level3 |
| Type2 | Level3 |
| Type3 | Level2 |
| Type4 | Level2 |
| Type5 | Level1 |
| ⋮ | ⋮ |

Fig.9

APPLICATION RISK INFORMATION

| APPLICATION | VULNERABILITY TYPE | RISK LEVEL |
|---|---|---|
| A1 | Tyep5 | Level1 |

Fig.10

| LIBRARY | VULNERABILITY TYPE |
|---------|--------------------|
| L1 | None |
| L2 | Type4 |
| L3 | Tyep4 |
| Lm | None |

Fig.11

| LIBRARY | VULNERABILITY TYPE | BECOME APPARENT OR NOT |
|---|---|---|
| L1 | None | None |
| L2 | Type4 | YES |
| L3 | Type4 | NO |
| Lm | None | None |

Fig.12

LIBRARY RISK INFORMATION

| LIBRARY | VULNERABILITY TYPE | RISK LEVEL |
|---------|--------------------|------------|
| L2 | Type4 | Level2 |
| L3 | Type4 | Level1 |

Fig.13

RISK EVALUATION RESULTS

CONTINUOUS EXECUTION CAN BE CARRIED OUT ALTHOUGH VULNERABILITY IS INCLUDED IN APPLICATION.

Fig.14

COUNTERMEASURE INFORMATION

| VULNERABILITY TYPE | COUNTERMEASURE |
|---|---|
| Type1 | APPLY PATCH |
| Type2 | APPLY PATCH |
| Type3 | UPGRADE |
| Type4 | CHANGE SETTING OF FIREWALL |
| Type5 | CHANGE FILE PERMISSION |
|  |  |

Fig.15

EVALUATION APPARATUS, EVALUATION SYSTEM, EVALUATION METHOD, AND PROGRAM

This application is a National Stage Entry of PCT/JP2019/041928 filed on Oct. 25, 2019, the contents of all of which are incorporated herein by reference, in their entirety.

BACKGROUND

Technical Field

The present invention relates to an evaluation apparatus, an evaluation system, an evaluation method, and a program.

Background Art

In recent years, the scale of software (application program) has been steadily increasing, and it is difficult to develop all the source codes on your own. Thus, development using source codes developed by the third party, which is referred to as open source software (OSS) or the like, has been actively carried out. For example, a part of functions of an application is implemented by a library released as OSS.

PTL 1 describes provision of a method and a computer program for reducing a workload in update of a security policy while maintaining security strength in an information processing apparatus having a function of mandatory access control.

PTL 2 describes provision of a vulnerability determination apparatus, a vulnerability determination method, and a vulnerability determination program that can solve a problem that vulnerability of a program is determined with only specific development information.

PTL 3 describes provision of a vulnerability determination apparatus and a program thereof that can determine only a piece of software having a high degree of influence over security for an electronic computer out of pieces of software whose vulnerability information is released, and can efficiently enhance the security.

CITATION LIST

Patent Literature

[PTL 1] JP 2016-162233 A
[PTL 2] JP 2010-117887 A
[PTL 3] JP 2010-067216 A

SUMMARY

Technical Problem

As described above, a library released as OSS may be incorporated into an application (application program). It is true that the released library also has a program, and often has vulnerability such as a bug and a security hole.

It is often the case that such a complicated structure is adopted that another library is further called in a library, and whether or not the vulnerability becomes apparent may change depending on a combination of libraries. When an application has such a complicated configuration, how much influence its vulnerability gives to a system may not be able to be determined unless the application is actually executed. In other words, in a system implemented by an application, vulnerability of software may become apparent after the application is started.

Usually, in a large-scale system such as a backbone system and an operational technology (OT) system, it is often the case that the application provided by the system is used by a large number of users. It is therefore often the case that frequently stopping the application to maintain and manage the application used in a large-scale system is not acceptable.

Accordingly, it is necessary to determine a risk in a program while executing an application (in particular, an application incorporating a library).

The present invention has a main example object to provide an evaluation apparatus, an evaluation system, an evaluation method, and a program that appropriately evaluate a risk from continuous execution of an application without stopping execution of the application.

Solution to Problem

According to a first perspective of the present invention, provided is an evaluation apparatus including: a first obtaining section configured to obtain application information related to an application being executed on a server; an evaluating section configured to evaluate a risk degree from continuous execution of the application on the server, based on the application information; and an output section configured to output an evaluation result of the risk degree.

According to a second perspective of the present invention, provided is an evaluation system including: a server configured to generate application information related to an application being executed; and an evaluation apparatus connected to the server, wherein the evaluation apparatus includes a first obtaining section configured to obtain the application information from the server, an evaluating section configured to evaluate a risk degree from continuous execution of the application on the server, based on the application information, and an output section configured to output an evaluation result of the risk degree.

According to a third perspective of the present invention, provided is an evaluation method including the steps of, in an evaluation apparatus: obtaining application information related to an application being executed on a server; evaluating a risk degree from continuous execution of the application on the server, based on the application information; and outputting an evaluation result of the risk degree.

According to a fourth perspective of the present invention, provided is a program that causes a computer mounted in an evaluation apparatus to execute: processing of obtaining application information related to an application being executed on a server; processing of evaluating a risk degree from continuous execution of the application on the server, based on the application information; and processing of outputting an evaluation result of the risk degree.

Advantageous Effects of Invention

According to each of the perspectives of the present invention, the evaluation apparatus, the evaluation system, the evaluation method, and the program that appropriately evaluate the risk from continuous execution of the application without stopping execution of the application are provided. Note that, according to the present invention, instead of or together with the above effects, other effects may be exerted.

BRIEF DESCRIPTION OF THE DRAWINGS

FIG. 5 is a diagram illustrating an example of vulnerability information;

FIG. 6 is a diagram illustrating an example of information in which a type of vulnerability and a detail of a defect are associated with each other;

FIG. 7 is a diagram illustrating an example of the vulnerability information;

FIG. 9 is a diagram describing operation of the risk degree evaluating section according to the first example embodiment;

FIG. 10 is a diagram illustrating an example of application risk information;

FIG. 11 is a diagram describing operation of the risk degree evaluating section according to the first example embodiment;

FIG. 12 is a diagram describing operation of the risk degree evaluating section according to the first example embodiment;

FIG. 13 is a diagram illustrating an example of library risk information;

FIG. 14 is a diagram illustrating an example displayed by the evaluation apparatus according to the first example embodiment;

FIG. 15 is a diagram illustrating an example of countermeasure information;

DESCRIPTION OF THE EXAMPLE EMBODIMENTS

Figure 1:
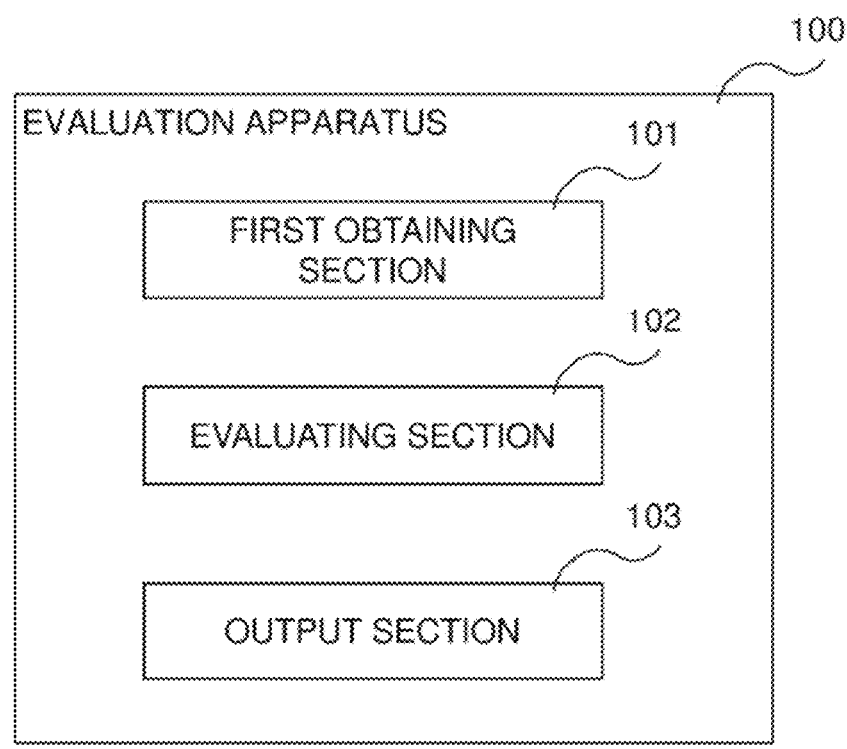
FIG. 1 is a diagram for describing an overview of an example embodiment.

First of all, an overview of an example embodiment will be described. Note that reference signs in the drawings provided in the overview are provided for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

An evaluation apparatus 100 according to an example embodiment includes a first obtaining section 101, an evaluating section 102, and an output section 103 (see FIG. 1). The first obtaining section 101 obtains application information related to an application being executed on a server. The evaluating section 102 evaluates a risk degree from continuous execution of the application on the server, based on the application information. The output section 103 outputs evaluation results of the risk degree.

The evaluation apparatus 100 evaluates the risk degree from continuous execution of the application, based on information of the application (application information) being actually executed on the server. The application information is information that can be generated before the server starts and the application is executed, and thus the evaluation can be performed even after the application starts on the server. For this reason, the risk from continuous execution of the application can be appropriately determined (evaluated) without stopping the execution of the application on the server.

Specific example embodiments will be described below in further detail with reference to the drawings.

First Example Embodiment

A first example embodiment will be described in further detail with reference to the drawings.

Figure 2:
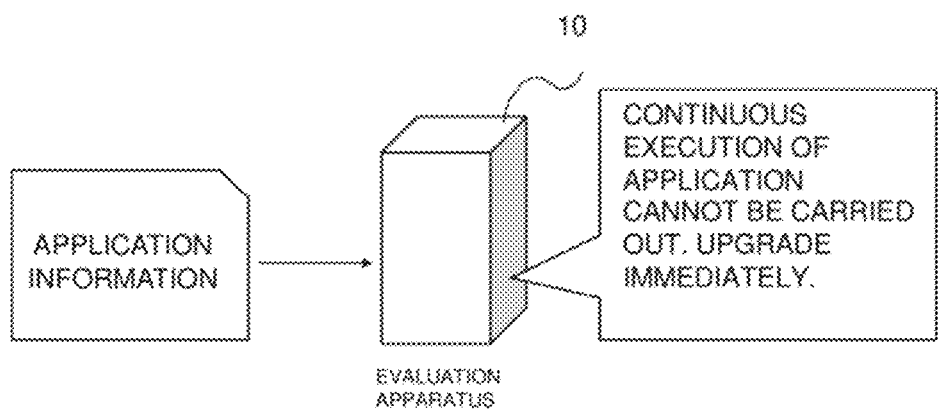
FIG. 2 is a diagram for describing an evaluation apparatus according to a first example embodiment.

FIG. 2 is a diagram for describing an evaluation apparatus 10 according to the first example embodiment. The evaluation apparatus 10 obtains the "application information" from the outside. The application information is information related to the application being executed on an external server (not illustrated in FIG. 2). The details related to the application information will be described later.

The evaluation apparatus 10 evaluates a risk degree (risk) from continuous execution of the application on the server, based on the application information, and provides information according to the evaluation results to an administrator or the like.

For example, when the evaluation apparatus 10 evaluates (determines) that there is a high risk from continuous execution of the application on the server being the base when the application information is generated, the evaluation apparatus 10 displays such an evaluation result on a liquid crystal monitor or the like.

When the evaluation apparatus 10 evaluates that there is a low risk from continuous execution of the application although vulnerability is acknowledged in the application as a risk evaluation target, the evaluation apparatus 10 may display such an evaluation result. When the evaluation apparatus 10 determines that vulnerability is not acknowledged in the application as a risk evaluation target, the evaluation apparatus 10 may display such an evaluation result.

The evaluation apparatus 10 may display a countermeasure together with the evaluation results. One example of the countermeasure is to stop execution of an application on the server and version upgrade an application and a library with acknowledged vulnerability or the like.

Figure 3:
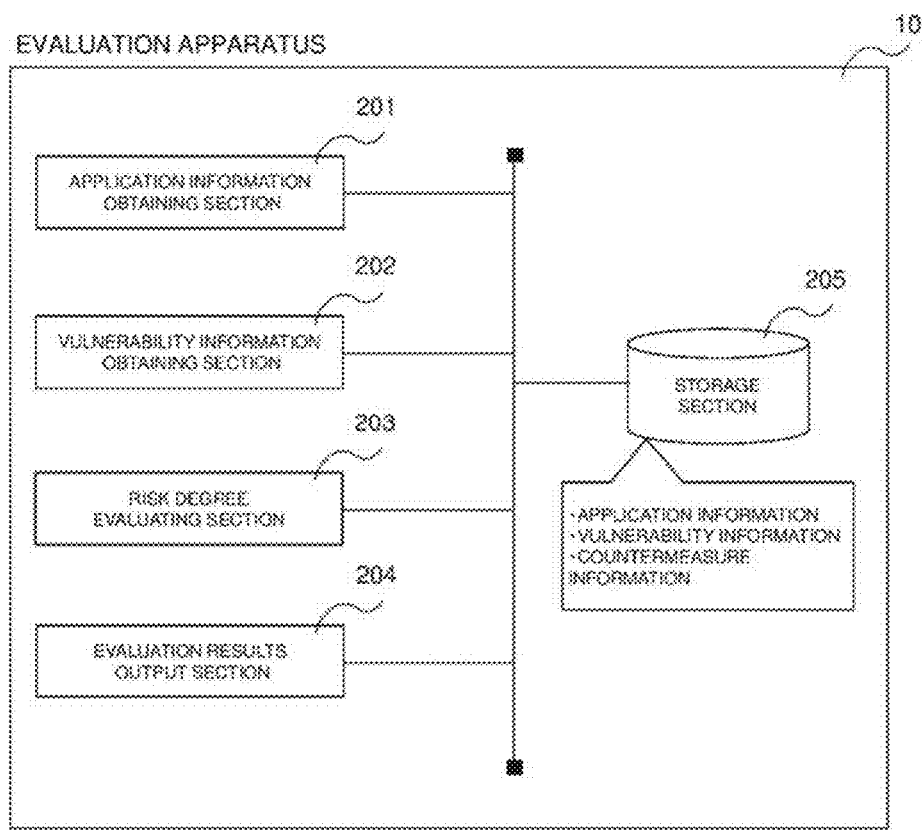
FIG. 3 is a diagram illustrating an example of a processing configuration of the evaluation apparatus according to the first example embodiment.

FIG. 3 is a diagram illustrating an example of a processing configuration (processing module) of the evaluation apparatus 10 according to the first example embodiment. With reference to FIG. 3, the evaluation apparatus 10 includes an application information obtaining section 201, a vulnerability information obtaining section 202, a risk degree evaluating section 203, an evaluation results output section 204, and a storage section 205.

The application information obtaining section 201 is a means for obtaining the application information. The application information is information related to each application being executed on the server as a risk evaluation target (see FIG. 4).

Figure 4:
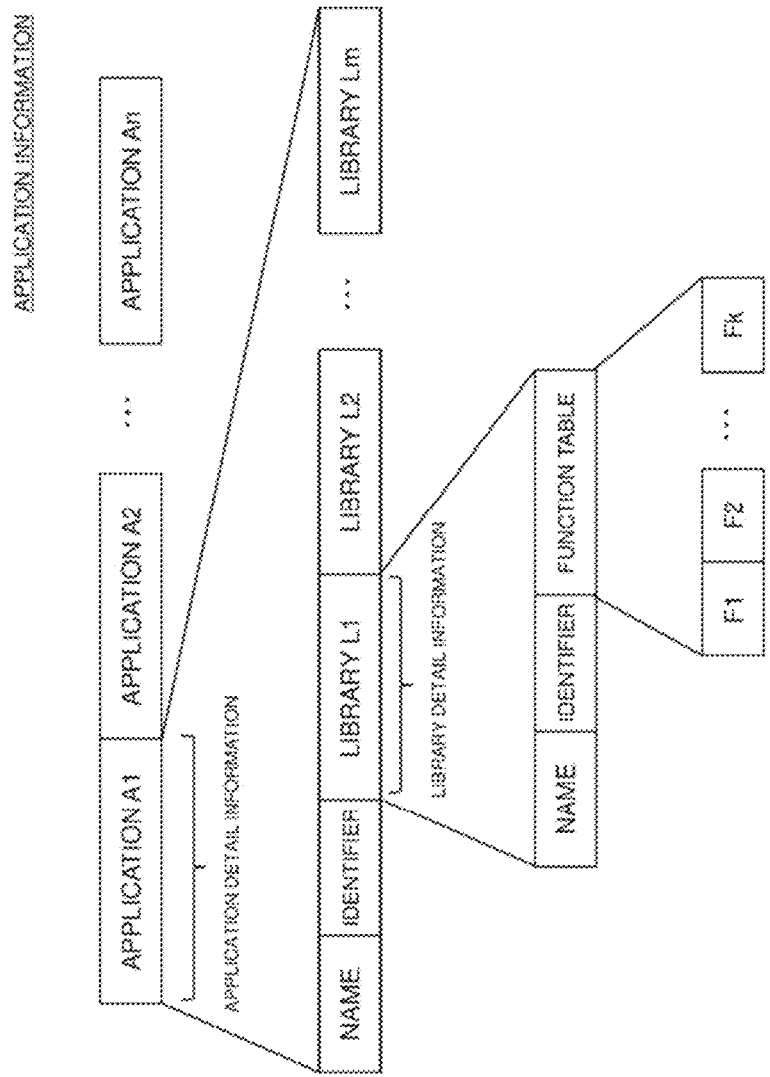
FIG. 4 is a diagram illustrating an example of application information.

For example, as illustrated in FIG. 4, suppose a case in which n (n is a positive integer; the same applies hereinafter)

applications are being executed on the server as a risk evaluation target. In this case, detail information related to each of the n applications (hereinafter referred to as application detail information) is included in the application information.

In the application detail information, for example, a name of the application, an identifier of the application, and detail information related to each library called (loaded) by the application (hereinafter referred to as library detail information) are included.

The identifier of the application may be any type of information as long as the application can be uniquely determined. For example, the version of the application is given as an example of the identifier.

Alternatively, a hash value of an execution file (binary file) of the application may be used as the identifier. The hash value has collision resistance, which means that the same hash value cannot be generated from different data, and determinism, which means that the same hash value is generated from the same data. Thus, the hash value generated from a binary file functions as an identifier that uniquely identifies the application.

As illustrated in FIG. 4, suppose a case in which an application A1 uses m (m is a positive integer; the same applies hereinafter) libraries. In this case, for example, the library detail information related to each of the m libraries is included in the detail information of the application A1.

In the library detail information, for example, a name of the library, an identifier of the library, and a function table are included.

As the identifier of the library, similarly to the identifier of the application, the version of the library and the hash value generated from a binary file of the library can be used.

The function table is table information in which a list of functions called by the application (functions provided to the application by the library) is described. For example, as illustrated in FIG. 4, in the library detail information of a library L1, k (k is a positive integer; the same applies hereinafter) functions F1 to Fk are described.

The application information can be generated by using a command and the like provided by an operating system (OS) being executed on the server. For example, if the OS operating on the server is Linux (registered trademark), a list of running applications (processes) can be obtained by using a ps command or the like. A list of libraries loaded at the time of starting the application can be obtained by using a command such as ldconfig.

Regarding generation of the function table, table information such as the Global Offset Table (GOT) and the Procedure Linkage Table (PLT) generated at the time of linking the application can be used for generation of the table. Making a reference to these pieces of table information provides an indication as to which function out of functions that can be provided by the library is called by each application.

The application information obtaining section 201 stores the obtained application information in the storage section 205.

The vulnerability information obtaining section 202 is a means for obtaining (collecting) information related to vulnerability of the application and the library (hereinafter referred to as vulnerability information). For example, the vulnerability information obtaining section 202 generates a graphical user interface (GUI) for inputting the vulnerability information, and obtains the vulnerability information from an administrator or the like.

The vulnerability information obtaining section 202 may obtain the vulnerability information from an external storage medium such as a Universal Serial Bus (USB) memory in which the vulnerability information is stored.

The vulnerability information obtaining section 202 may access a database server on a network and a server managed by a developer or the like of the application and the library, and obtain the vulnerability information from these servers. Specifically, the vulnerability information obtaining section 202 may manage the vulnerability information related to the library released as OSS in a centralized manner, access the server that provides information, and obtain the vulnerability information from the server.

FIG. 5 is a diagram illustrating an example of the vulnerability information. As illustrated in FIG. 5, for example, in the vulnerability information, a name of the application and the library, an identifier of the application and the like, and information in which the content of vulnerability is described (hereinafter referred to as vulnerability detail information) are included.

The identifier of the application and the like is information (the version of the application or the like, a hash value of a binary file) similar to the identifier included in the application information.

In the vulnerability detail information, for example, a type of vulnerability and a specific content of the vulnerability are included.

The type of vulnerability is information determined by an administrator or the like in advance according to the content of the vulnerability (defect) of the application and the library. For example, as illustrated in FIG. 6, the type of vulnerability and the content of the defect are associated with each other.

For example, the administrator or the like checks a website managed by a creator of the application and the library, and generates the vulnerability detail information, based on defect information described in the website and the information as illustrated in FIG. 6.

Alternatively, in the website, information in which an identifier of the application or the like in which vulnerability is detected, a type of the vulnerability, and a specific content of the vulnerability are associated with each other may be provided. In this case, the vulnerability information obtaining section 202 can directly obtain the vulnerability information as illustrated in FIG. 6 from the website.

The vulnerability information related to the application and the vulnerability information related to the library include different fields.

FIG. 7A illustrates an example of the vulnerability information related to the application. As illustrated in FIG. 7A, in the vulnerability detail information of the vulnerability information related to the application, a type and a specific content of vulnerability are included. In the example of FIG. 7A, version 1.1 of the application A1 has a defect (vulnerability) that any code (execution file) can be carried out under a specific condition. The defect is classified as type 1 as illustrated in FIG. 6.

FIG. 7B illustrates an example of the vulnerability information related to the library. As illustrated in FIG. 7B, in the vulnerability detail information of the vulnerability information related to the library, a defect function (defect function field) is included in addition to a type and a specific content of vulnerability. In this manner, in the vulnerability detail information of the library, a function having vulnerability is described as a defect function. The defect function is information for identifying a function having vulnerability (defect) out of functions that can be provided by the library.

In the example of FIG. 7B, version 2.2 of the library L1 has vulnerability that there is a security hole in a port number X1 in a function F5. The vulnerability is classified as type 4 as illustrated in FIG. 6.

The vulnerability information obtaining section 202 stores the obtained vulnerability information in the storage section 205. Note that the vulnerability information obtaining section 202 repeatedly obtains (collects) new vulnerability information, and stores the obtained vulnerability information in the storage section 205.

For example, the vulnerability information obtaining section 202 accesses a database server or the like having the vulnerability information periodically or at timing determined in advance, and obtains the latest vulnerability information. The vulnerability information obtaining section 202 stores the obtained vulnerability information in the storage section 205.

The risk degree evaluating section 203 is a means for evaluating the risk degree (risk) from continuous execution of the application on the server, based on the application information. More specifically, the risk degree evaluating section 203 evaluates the risk degree from continuous execution of the application on the server as a determination target, based on the application information and the vulnerability information. The risk degree evaluating section 203 generates evaluation results of the risk degree as "risk information".

Figure 8:
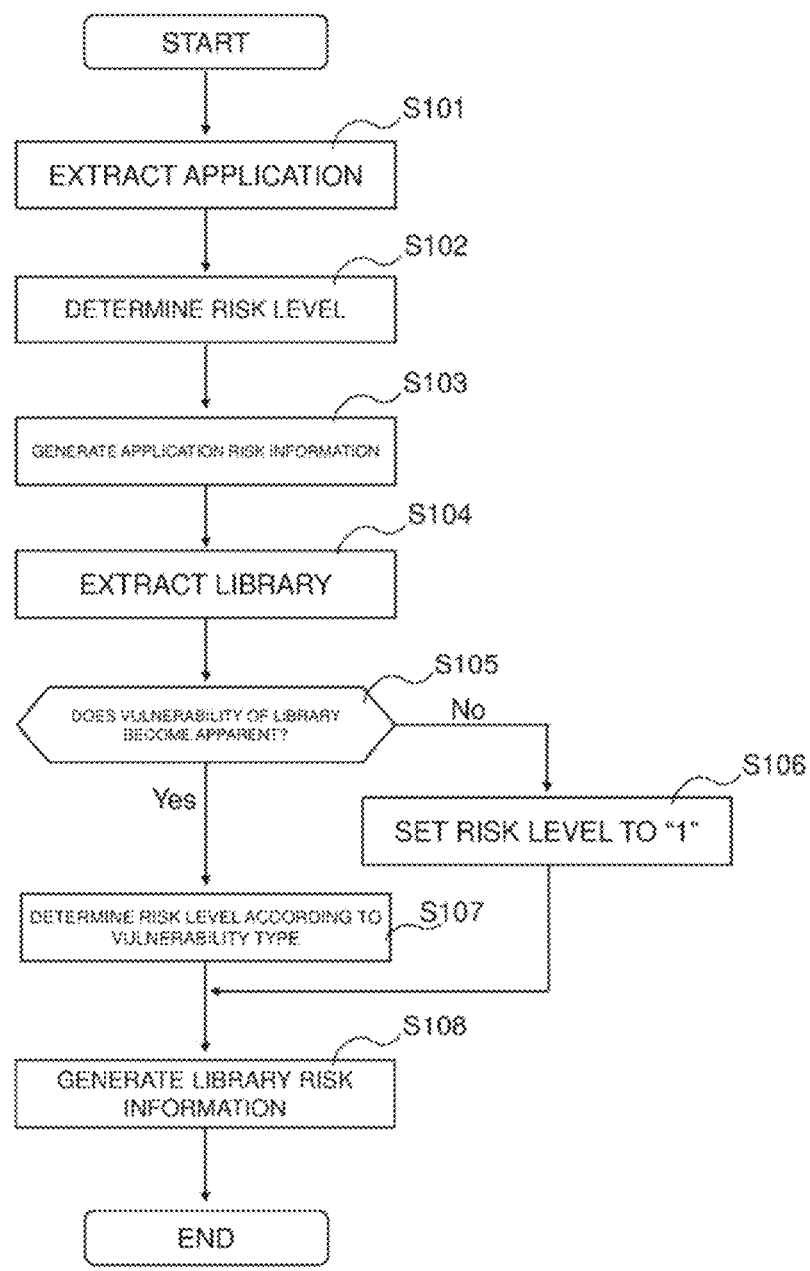
FIG. 8 is a flowchart illustrating an example of operation of a risk degree evaluating section according to the first example embodiment.

FIG. 8 is a flowchart illustrating an example of operation of the risk degree evaluating section 203.

The risk degree evaluating section 203 extracts an application in which corresponding vulnerability information is stored in the storage section 205 out of the applications described in the application information (Step S101).

In the example of FIG. 4, whether or not there is corresponding vulnerability information is checked for each of the applications A1 to An, and an application in which there is corresponding vulnerability information is extracted. Specifically, if the vulnerability information having the same identifier as the identifier of the application described in the application information is stored in the storage section 205, the risk degree evaluating section 203 extracts the application. In other words, the risk degree evaluating section 203 extracts the application in which the vulnerability information is stored in the storage section 205 out of the plurality of applications included in the application information.

The risk degree evaluating section 203 determines the risk degree (hereinafter referred to as a risk level) from continuous execution of the application regarding the extracted application (Step S102).

Specifically, the risk degree evaluating section 203 refers to information in which the vulnerability type described in the vulnerability information and the risk level are associated with each other, and determines the risk level.

For example, in the storage section 205, information as illustrated in FIG. 9 is stored. As illustrated in FIG. 9, the vulnerability type and its corresponding risk level are associated with each other and stored in the storage section 205. Note that, in the example of FIG. 9, the risk level is classified in three stages. It is indicated that as the number of the risk level is larger, the risk degree thereof is higher, and level 3 has the greatest risk.

For example, the relationship between each of the levels and its contents is defined as follows.

Level 3: Continuous execution of the application is unacceptable, and an urgent countermeasure needs to be taken.

Level 2: Continuous execution of the application is acceptable, but a countermeasure needs to be taken.

Level 1: Continuous execution of the application is acceptable, and no countermeasure needs to be taken.

For example, if there is corresponding vulnerability information in the application A1 out of the applications A1 to An and its vulnerability type is "Type 5", it is determined that the risk level is "1".

The risk degree evaluating section 203 generates the risk information (application risk information) related to the application, based on the extracted application, the corresponding vulnerability information (vulnerability type), and the determined risk level (Step S103). In the example described above, information as illustrated in FIG. 10 is generated as the application risk information. In this manner, the risk degree evaluating section 203 generates the application risk information including the risk level indicating the risk degree from continuous execution of the extracted application, based on the vulnerability type of the vulnerability detail information corresponding to the extracted application.

The risk degree evaluating section 203 extracts a library in which corresponding vulnerability information is stored in the storage section 205 out of the libraries described in the application information (Step S104).

Specifically, if the vulnerability information having the same identifier as the identifier of the library described in the application information (application detail information) is stored in the storage section 205, the risk degree evaluating section 203 extracts the library.

Regarding the extracted library, the risk degree evaluating section 203 determines whether or not the vulnerability of the library becomes apparent by continuously executing the application (Step S105).

Specifically, when the function described in the defect function field of the vulnerability detail information of the library is not present in the function table included in corresponding application information (library detail information), the risk degree evaluating section 203 determines that the vulnerability does not become apparent. In this case, the risk degree evaluating section 203 sets the risk level of the library to "1" (Step S106).

When the function described in the defect function field of the vulnerability detail information of the library is present in the function table included in corresponding application information (library detail information), the risk degree evaluating section 203 determines that the vulnerability becomes apparent. In this case, the risk degree evaluating section 203 determines the risk level of the library according to the vulnerability type (Step S107).

The operations of Steps S105 to S107 described above are specifically described as follows.

For example, as illustrated in FIG. 11, suppose a case in which vulnerability of type 4 is included in the libraries L2 and L3. In this case, the risk degree evaluating section 203 refers to the vulnerability detail information of the libraries L2 and L3, and checks whether or not the function described in the defect function field is included in the function table of corresponding application information.

Suppose a case in which the defect function of the vulnerability detail information is included in the function table of the application information regarding the library L2, and the defect function of the vulnerability detail information is not included in the function table of the application information regarding the library L3. In this case, determination as to whether or not the vulnerability of the library becomes apparent yields results as illustrated in FIG. 12.

As described above, the risk degree evaluating section 203 sets the risk level to the lowest value (level 1) regarding the library that has vulnerability but the vulnerability does not become apparent. In contrast, regarding the library that has vulnerability and the vulnerability becomes apparent, the risk degree evaluating section 203 sets the risk level according to the vulnerability type. In the example illustrated in FIG. 12, the risk level of the library L2 is "2".

The risk degree evaluating section 203 generates the risk information (library risk information) related to the library, based on the extracted library, the corresponding vulnerability detail information (vulnerability type), and the determined risk level (Step S108). In the example described above, information as illustrated in FIG. 13 is generated as the library risk information.

In this manner, when the vulnerability of the extracted library does not become apparent, the risk degree evaluating section 203 assigns a low risk level to the extracted library. In contrast, when the vulnerability of the extracted library becomes apparent, the risk degree evaluating section 203 assigns a high risk level to the extracted library. Subsequently, the risk degree evaluating section 203 generates the library risk information including the low risk level or the high risk level.

The risk degree evaluating section 203 delivers the risk information (application risk information, library risk information) to the evaluation results output section 204. Note that, when there is no risk information related to each application and each library described in the application information, the risk degree evaluating section 203 notifies the evaluation results output section 204 of the non-existence.

The evaluation results output section 204 is a means for outputting the evaluation results of the risk degree evaluated by the risk degree evaluating section 203. The evaluation results output section 204 outputs the evaluation results regarding continuous execution of the application on the server as a determination target to the administrator or the like, based on the risk information. Specifically, the evaluation results output section 204 outputs a message related to the risk degree from execution of the application on the server according to the risk level included in the application risk information and the library risk information.

For example, the evaluation results output section 204 may display the message (evaluation results) in a liquid crystal monitor or the like, or may transmit the message to a predetermined email address or the like. Alternatively, the evaluation results output section 204 may print out the evaluation results using a printer.

For example, when the evaluation results output section 204 receives information indicating that there is no risk information, from the risk degree evaluating section 203, the evaluation results output section 204 displays information indicating that there is no risk from continuous execution of the application in a liquid crystal monitor or the like.

When the evaluation results output section 204 receives risk information, the evaluation results output section 204 performs display according to the risk level. For example, suppose a case in which the risk levels of level 3 and level 2 are not included and the risk level of level 1 is included in the risk information. In this case, the evaluation results output section 204 outputs information indicating that continuous execution of the application can be carried out although vulnerability is included in the application being executed on the server (see FIG. 14).

When the risk level of level 2 or higher is included in the risk information, the evaluation results output section 204 displays a message according to the highest risk level. For example, when level 2 is the highest risk level, the evaluation results output section 204 displays information indicating that "continuous execution of the application is acceptable, but a countermeasure needs to be taken". When the highest risk level is level 3, the evaluation results output section 204 displays information indicating that "continuous execution of the application is unacceptable, and an urgent countermeasure needs to be taken".

In addition, the evaluation results output section 204 may display a countermeasure corresponding to each risk level of level 2 or higher together with the message. In other words, the evaluation results output section 204 may output a countermeasure for avoiding vulnerability together with the message.

For example, information as illustrated FIG. 15 is stored in the storage section 205 as "countermeasure information".

Figure 16:
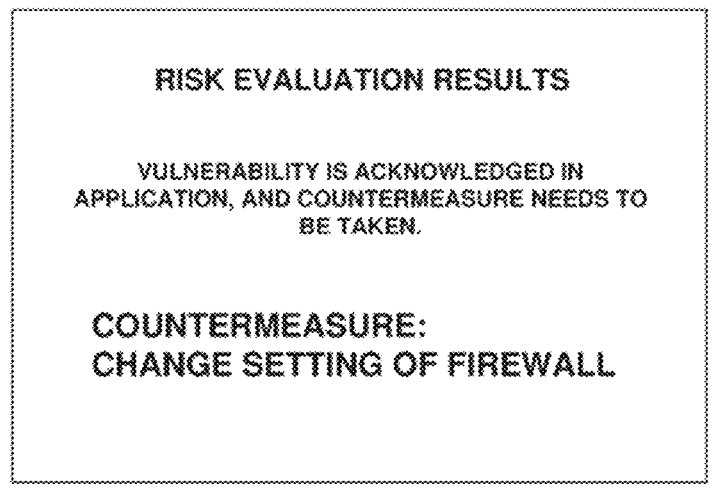
FIG. 16 is a diagram illustrating an example displayed by the evaluation apparatus according to the first example embodiment.

The evaluation results output section 204 refers to the countermeasure information, and obtains a countermeasure according to the vulnerability type included in the risk information. For example, the evaluation results output section 204 that has obtained the risk information as illustrated in FIG. 13 may perform display as illustrated in FIG. 16.

As described above, the evaluation apparatus 10 according to the first example embodiment determines the risk (risk degree) from continuous execution of the application, based on information of the application (application information) being actually executed on the server. The application information is information that can be generated before the server starts and the application is executed, and thus the determination can be performed even after the application starts on the server. In other words, by using the evaluation apparatus 10 according to the first example embodiment, the risk of a case in which the application is continuously executed on the server can be appropriately determined without stopping the server as a risk evaluation target. In other words, the evaluation apparatus 10 according to the first example embodiment inputs information indicating a starting status at the time of starting the application as a snapshot, and compares (collates) the information with vulnerability that becomes clear afterward. The evaluation apparatus 10 determines influence of the vulnerability on the server through the comparison.

Even if there is no change in the application (application program) being executed on the server, vulnerability (a bug, a security hole, or the like) of the application or the library used therein in some cases becomes clear afterward. The evaluation apparatus 10 according to the first example embodiment can evaluate the risk related to the application being executed based on the latest vulnerability information, and thus unnecessary stopping of the server can be eliminated. In other words, even if vulnerability is detected in the library, the vulnerability does not become apparent and the server need not be stopped on the condition that a function having the vulnerability is not used.

Alternatively, even if vulnerability that becomes apparent is detected, the method of avoiding the vulnerability is not limited to stopping the server and updating the application and the library. For example, the above case can also be coped with by changing setting of a communication device (for example, a firewall or the like) connected to the server. Regarding the vulnerability that can be coped with by changing setting of a communication device as described above, the evaluation apparatus 10 according to the first example embodiment stores its countermeasure in the storage section 205 in advance, and presents the countermeasure to the administrator or the like as necessary. As a result, even if the ideal countermeasure is a countermeasure of stopping the server and updating the application or the like for the sake of avoidance of vulnerability in the future, in a case in which the server need not be stopped immediately, presentation of information indicating unnecessity of server stopping and its countermeasure allows for ensuring of security while avoiding unnecessary stopping of the server.

Second Example Embodiment

Next, a second example embodiment will be described in detail with reference to the drawings.

Figure 17:
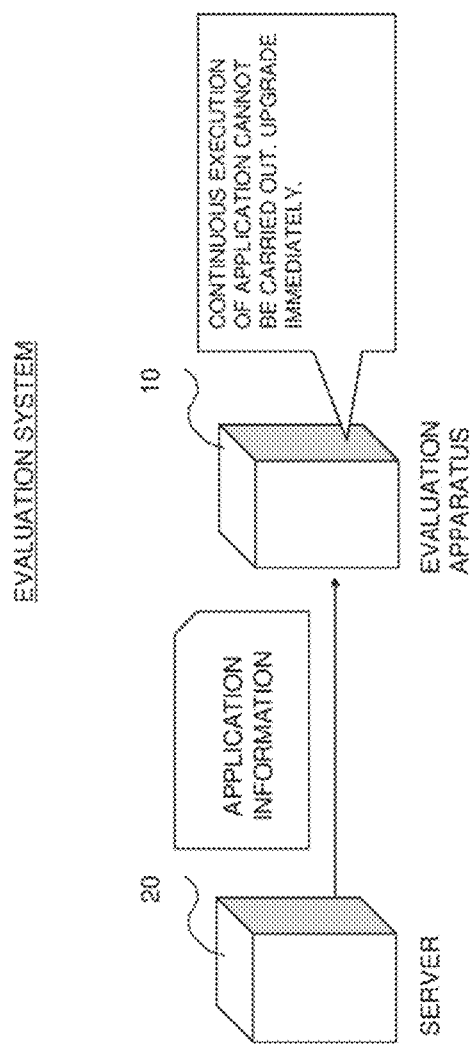
FIG. 17 is a diagram illustrating an example of a schematic configuration of an evaluation system according to a second example embodiment.

In the second example embodiment, a case in which the server generates the application information described in the first example embodiment will be described. As illustrated in FIG. 17, in the second example embodiment, a server 20 generates the application information. The evaluation apparatus 10 and the server 20 are connected in a wired or wireless manner and are configured to be capable of communication with each other.

Figure 18:
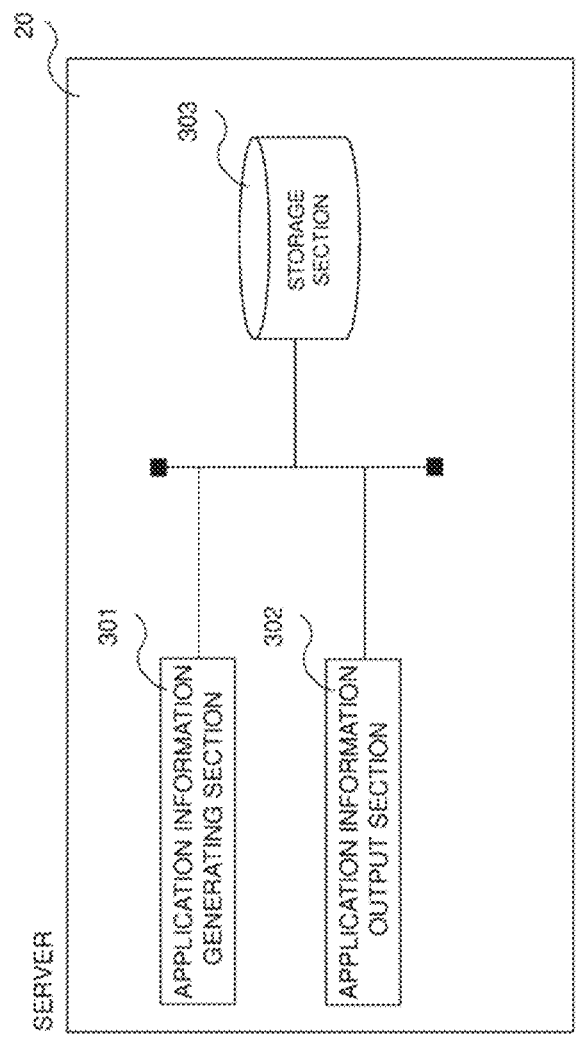
FIG. 18 is a diagram illustrating an example of a processing configuration of a server according to the second example embodiment.

FIG. 18 is a diagram illustrating an example of a processing configuration (processing module) of the server 20 according to the second example embodiment. With reference to FIG. 18, the server 20 includes an application information generating section 301, an application information output section 302, and a storage section 303.

Note that the processing configuration of the evaluation apparatus 10 according to the second example embodiment can be similar to that of the first example embodiment, and thus description corresponding to, for example, FIG. 3 will be omitted.

The application information generating section 301 is a means for generating the application information. The application information generating section 301 can be implemented as a function of the OS executed on the server 20.

Specifically, the application information generating section 301 collects information related to the application and the library being executed on the server 20 by using the command and the like described in the first example embodiment. The application information generating section 301 refers to the table information such as the GOT and the PLT described in the first example embodiment, and collects information related to the function of the library used by the application. Note that the table information such as the GOT and the PLT is stored in the storage section 303.

The application information generating section 301 generates the application information by integrating the collected information into the format as illustrated in FIG. 4. The application information generating section 301 delivers the generated application information to the application information output section 302.

The application information output section 302 transmits the obtained application information to the evaluation apparatus 10.

As described above, in the second example embodiment, the server 20 automatically generates the application information, and provides the application information to the evaluation apparatus 10. Thus, for example, with the server 20 periodically generating the application information and providing the application information to the evaluation apparatus 10, the risk of the application is also periodically checked.

Figure 19:
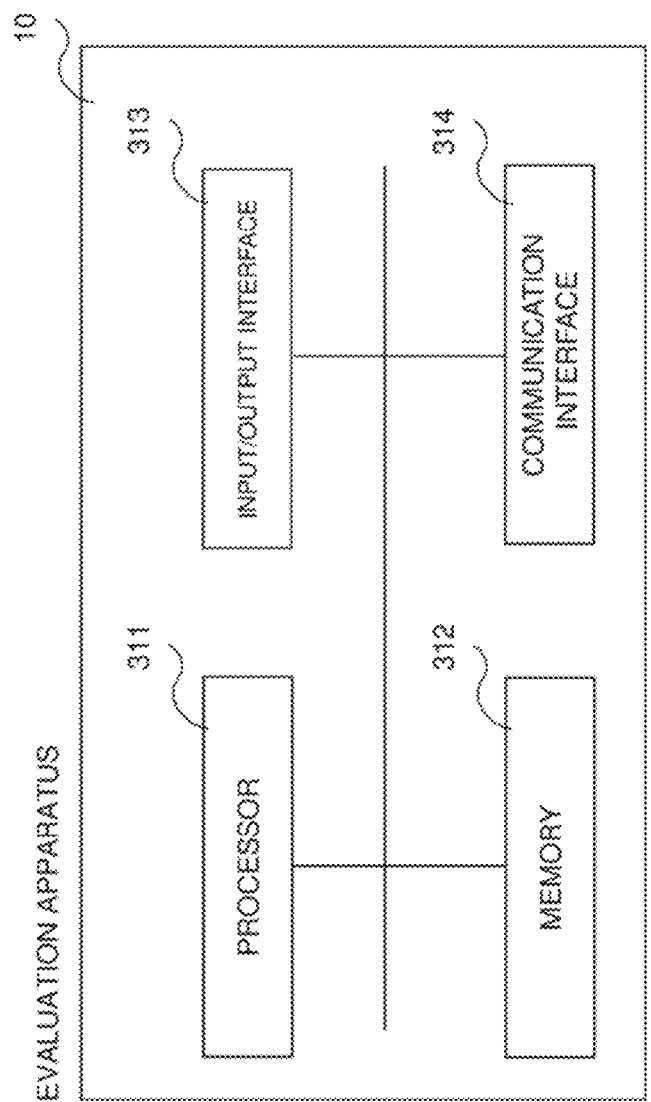
FIG. 19 is a diagram illustrating an example of a hardware configuration of the evaluation apparatus.

Next, hardware of each apparatus included in an evaluation system will be described. FIG. 19 is a diagram illustrating an example of a hardware configuration of the evaluation apparatus 10.

The evaluation apparatus 10 can be configured with an information processing apparatus (so-called a computer), and includes a configuration illustrated in FIG. 19. For example, the evaluation apparatus 10 includes a processor 311, a memory 312, an input/output interface 313, a communication interface 314, and the like. Constituent elements such as the processor 311 are connected to each other with an internal bus or the like, and are configured to be capable of communicating with each other.

Note that the configuration illustrated in FIG. 19 is not to limit the hardware configuration of the evaluation apparatus 10. The evaluation apparatus 10 may include hardware (not illustrated), or need not include the input/output interface 313 as necessary. The number of processors 311 and the like included in the evaluation apparatus 10 are not to be limited to the example illustrated in FIG. 19, and for example, a plurality of processors 311 may be included in the evaluation apparatus 10.

The processor 311 is, for example, a programmable device such as a central processing section (CPU), a micro processing section (MPU), and a digital signal processor (DSP). Alternatively, the processor 311 may be a device such as a field programmable gate array (FPGA) and an application specific integrated circuit (ASIC). The processor 311 executes various programs including the operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a network interface card (NIC) or the like.

The function of the evaluation apparatus 10 is implemented by various processing modules. Each of the processing modules is, for example, implemented by the processor 311 executing a program stored in the memory 312. The program can be recorded on a computer readable storage medium. The storage medium can be a non-transient (non-transitory) storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that the server 20 can also be configured with an information processing apparatus similarly to the evaluation apparatus 10, and its basic hardware configuration has no difference from that of the evaluation apparatus 10, and thus description thereof will be omitted.

Example Alterations

Note that the configuration, the operation, and the like of the evaluation apparatus 10 described in the example embodiments described above are merely examples, and are not to limit the configuration and the like of the evaluation apparatus 10.

For example, the application information described with reference to FIG. 4 is merely an example, and another element may be included in the application information in addition to the elements illustrated in FIG. 4. For example, in the application detail information, set values of the registry and startup options of each application may be included.

The example embodiments describe a case in which the vulnerability type is determined based on the contents of the vulnerability with the use of the table information as illustrated in FIG. 6. However, machine learning such as deep learning may be used for determination of the vulnerability type. Specifically, the evaluation apparatus 10 performs machine learning by using teaching data in which a specific content of vulnerability and the vulnerability type are associated with each other, and thereby generates a classification model (classifier). For the generation of the classification model by the evaluation apparatus 10, any algorithm such as a support-vector machine, boosting, and a neural network can be used. Note that publicly known techniques can be used for the algorithm such as the support-vector machine, and thus description thereof will be omitted. The evaluation apparatus 10 may obtain the vulnerability type by inputting a specific content of the vulnerability obtained from a website or the like into the generated classification model.

The example embodiments describe a configuration in which the function table is generated based on the table information such as the GOT and the PLT. However, some OSs may reuse a library once loaded by another application (library cached on memory) in order to save memory consumption. When such a reuse of a cached library is performed, an actually operating function and a function described in the function table may differ. In view of this, the server 20 may monitor and manage the cached library, and generate a more accurate function table. For example, if a library a is loaded on a memory when the application A starts, the library a is cached in the memory. If an application B starts afterwards and requires the library a, the library a is loaded from the cache. In view of such a situation, even if the library a stored in a hard disk or the like is version upgraded, the version upgrade is not applied to the cached library a. However, update of the library a is applied to the table information such as the GOT and the PLT, and thus the version of an actually operating library and the version of a library described in the function table differ. The server 20 may monitor the library cached in the memory and generate the application information in order to avoid such inconvenience.

The example embodiments describe a configuration in which the evaluation apparatus 10 displays a message and a countermeasure according to the risk level. However, the display of the message and the like is merely an example, and the evaluation apparatus 10 may display other information. For example, the evaluation apparatus 10 may display the name, the version, or the like of the application and the library having vulnerability.

By installing an evaluation program in a storage section of a computer, the computer can be caused to function as the evaluation apparatus. By causing the computer to execute the evaluation program, an evaluation method can be executed by the computer.

In the flowchart used in the description above, a plurality of processes (processing) are described in order; however, the order of execution of the processes executed in each of the example embodiments is not limited to the described order. In each example embodiment, the illustrated order of processes can be changed as far as there is no problem with regard to processing contents, such as a change in which respective processes are executed in parallel, for example. The example embodiments described above can be combined with each other as far as the details are consistent.

The whole or part of the example embodiments described above can be described as, but not limited to, the following supplementary notes.

Supplementary Note 1

An evaluation apparatus (10, 100) including:
a first obtaining section (101, 201) configured to obtain application information related to an application being executed on a server (20);
an evaluating section (102, 203) configured to evaluate a risk degree from continuous execution of the application on the server (20), based on the application information; and
an output section (103, 204) configured to output an evaluation result of the risk degree.

Supplementary Note 2

The evaluation apparatus (10, 100) according to supplementary note 1, further including:
a second obtaining section (202) configured to obtain vulnerability information related to vulnerability of the application and a library, wherein
the evaluating section (102, 203) is configured to evaluate the risk degree, based on the application information and the vulnerability information.

Supplementary Note 3

The evaluation apparatus (10, 100) according to supplementary note 2, wherein
the application information includes detail information of the application being executed on the server (20),
the detail information of the application includes an identifier of the application and detail information of the library called by the application, and
the detail information of the library includes an identifier of the library and a function table in which a function called from the application is described.

Supplementary Note 4

The evaluation apparatus (10, 100) according to supplementary note 3, wherein
the vulnerability information includes the identifier of the application and the library having vulnerability, and vulnerability detail information in which a content of the vulnerability is described, and
the vulnerability detail information includes a vulnerability type determined based on the content of the vulnerability.

Supplementary Note 5

The evaluation apparatus (10, 100) according to supplementary note 4, wherein
the evaluating section (102, 203) is configured to
extract the application in which the identifier of the application included in the detail information of the application and the identifier of the application having the vulnerability included in the vulnerability information match, and generate application risk information including a first risk level indicating the risk degree from continuous execution of the extracted application, based on the vulnerability type of the vulnerability detail information corresponding to the extracted application.

Supplementary Note 6

The evaluation apparatus (10, 100) according to supplementary note 5, wherein
the evaluating section (102, 203) is configured to
extract the library in which the identifier of the library included in the detail information of the library and the identifier of the library having the vulnerability included in the vulnerability information match, and determine whether or not the vulnerability described in the vulnerability detail information corresponding to the extracted library becomes apparent.

Supplementary Note 7

The evaluation apparatus (10, 100) according to supplementary note 6, wherein
in the vulnerability detail information of the library, the function having the vulnerability is described as a defect function, and
the evaluating section (102, 203) is configured to, when the defect function described in the vulnerability detail information of the extracted library is present in the function table of the detail information of the library corresponding to the extracted library, determine that the vulnerability becomes apparent.

Supplementary Note 8

The evaluation apparatus (10, 100) according to supplementary note 7, wherein
the evaluating section (102, 203) is configured to
when the vulnerability of the extracted library does not become apparent, assign a second risk level to the extracted library,
when the vulnerability of the extracted library becomes apparent, assign a third risk level having a value larger than the second risk level to the extracted library, and
generate library risk information including the second risk level or the third risk level.

Supplementary Note 9

The evaluation apparatus (10, 100) according to supplementary note 8, wherein
the output section (103, 204) is configured to output a message related to the risk degree from execution of the application on the server (20) according to a risk level included in the application risk information and the library risk information.

Supplementary Note 10

The evaluation apparatus (10, 100) according to supplementary note 9, wherein
the output section (103, 204) is configured to output a countermeasure for avoiding the vulnerability together with the message.

Supplementary Note 11

The evaluation apparatus (10, 100) according to any one of supplementary notes 3 to 10, wherein the identifier of the application and the identifier of the library are each a hash value.

Supplementary Note 12

An evaluation system including:
a server (20) configured to generate application information related to an application being executed; and
an evaluation apparatus (10, 100) connected to the server (20), wherein
the evaluation apparatus (10, 100) includes
a first obtaining section (101, 201) configured to obtain the application information from the server (20),
an evaluating section (102, 203) configured to evaluate a risk degree from continuous execution of the application on the server (20), based on the application information, and
an output section (103, 204) configured to output an evaluation result of the risk degree.

Supplementary Note 13

An evaluation method including, in an evaluation apparatus (10, 100):
obtaining application information related to an application being executed on a server (20);
evaluating a risk degree from continuous execution of the application on the server (20), based on the application information; and
outputting an evaluation result of the risk degree.

Supplementary Note 14

A program that causes a computer (311) mounted in an evaluation apparatus (10, 100) to execute:
processing of obtaining application information related to an application being executed on a server (20);
processing of evaluating a risk degree from continuous execution of the application on the server (20), based on the application information; and
processing of outputting an evaluation result of the risk degree.

Note that the modes of supplementary note 12 to supplementary note 14 can be developed into the mode of supplementary note 2 to the mode of supplementary note 11 similarly to the mode of supplementary note 1.

Note that the disclosure of each of the cited literatures in Citation List described above is incorporated herein by reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

REFERENCE SIGNS LIST

10, 100 Evaluation Apparatus
20 Server
101 First Obtaining Section
102 Evaluating Section
103 Output Section
201 Application Information Obtaining Section
202 Vulnerability Information Obtaining Section
203 Risk Degree Evaluating Section 204 Evaluation Results Output Section
205, 303 Storage Section
301 Application Information Generating Section
302 Application Information Output Section
311 Processor
312 Memory
313 Input/Output Interface
314 Communication Interface

What is claimed is:

1. An evaluation apparatus comprising:
a memory storing instructions; and
one or more processors configured to execute the instructions to:
　obtain application information related to an application being executed on a server;
　obtain vulnerability information related to a vulnerability of the application and a library;
　evaluate a risk degree from continuous execution of the application on the server, based on the application information, without stopping execution of the application on the server;
　evaluate a risk level indicating the risk degree, based on the application information and the vulnerability information;
　output an evaluation result of the risk degree; and
　output a message and a countermeasure for avoiding the vulnerability, according to the risk level, wherein
the application information includes detail information of the application being executed on the server,
the detail information of the application includes an identifier of the application and detail information of the library called by the application,
the detail information of the library includes an identifier of the library and a function table in which a function called from the application is described,
the vulnerability information includes the identifier of the application and the library having the vulnerability, and vulnerability detail information in which content of the vulnerability is described,
the vulnerability detail information includes a vulnerability type determined based on the content of the vulnerability,
the one or more processors are configured to:
　extract the application in which the identifier of the application included in the detail information of the application and the identifier of the application having the vulnerability included in the vulnerability information match;
　generate application risk information including a first risk level indicating the risk degree from continuous execution of the extracted application, based on the vulnerability type of the vulnerability detail information corresponding to the extracted application;
　extract the library in which the identifier of the library included in the detail information of the library and the identifier of the library having the vulnerability included in the vulnerability information match; and
　determine whether or not the vulnerability described in the vulnerability detail information corresponding to the extracted library becomes apparent,
in the vulnerability detail information of the library, the function having the vulnerability is described as a defect function, and
the one or more processors are configured to:
　when the defect function described in the vulnerability detail information of the extracted library is present in the function table of the detail information of the library corresponding to the extracted library, determine that the vulnerability becomes apparent;
　when the vulnerability of the extracted library does not become apparent, assign a second risk level to the extracted library;
　when the vulnerability of the extracted library then becomes apparent, assign a third risk level having a value larger than the second risk level to the extracted library; and
　generate library risk information including the second risk level or the third risk level.

2. The evaluation apparatus according to claim 1, wherein the identifier of the application and the identifier of the library are each a hash value.

3. An evaluation system comprising:
a server configured to generate application information related to an application being executed; and
an evaluation apparatus connected to the server, comprising:
　a memory storing instructions; and
　one or more processors configured to execute the instructions to:
　　obtain the application information from the server,
　　obtain vulnerability information related to a vulnerability of the application and a library;
　　evaluate a risk degree from continuous execution of the application on the server, based on the application information, without stopping execution of the application on the server;
　　evaluate a risk level indicating the risk degree, based on the application information and the vulnerability information;
　　output an evaluation result of the risk degree; and
　　output a message and a countermeasure for avoiding the vulnerability, according to the risk level, wherein
the application information includes detail information of the application being executed on the server,
the detail information of the application includes an identifier of the application and detail information of the library called by the application,
the detail information of the library includes an identifier of the library and a function table in which a function called from the application is described,
the vulnerability information includes the identifier of the application and the library having the vulnerability, and vulnerability detail information in which content of the vulnerability is described,
the vulnerability detail information includes a vulnerability type determined based on the content of the vulnerability,
the one or more processors are configured to:
　extract the application in which the identifier of the application included in the detail information of the application and the identifier of the application having the vulnerability included in the vulnerability information match;
　generate application risk information including a first risk level indicating the risk degree from continuous execution of the extracted application, based on the vulnerability type of the vulnerability detail information corresponding to the extracted application;
　extract the library in which the identifier of the library included in the detail information of the library and the identifier of the library having the vulnerability included in the vulnerability information match; and determine whether or not the vulnerability described in the vulnerability detail information corresponding to the extracted library becomes apparent, in the vulnerability detail information of the library, the function having the vulnerability is described as a defect function, and the one or more processors are configured to:
when the defect function described in the vulnerability detail information of the extracted library is present in the function table of the detail information of the library corresponding to the extracted library, determine that the vulnerability becomes apparent;
when the vulnerability of the extracted library does not become apparent, assign a second risk level to the extracted library;
when the vulnerability of the extracted library then becomes apparent, assign a third risk level having a value larger than the second risk level to the extracted library; and
generate library risk information including the second risk level or the third risk level.

4. An evaluation method performed by an evaluation apparatus and comprising:
obtaining application information related to an application being executed on a server;
obtaining vulnerability information related to a vulnerability of the application and a library;
evaluating a risk degree from continuous execution of the application on the server, based on the application information, without stopping execution of the application on the server;
evaluating a risk level indicating the risk degree, based on the application information and the vulnerability information;
outputting an evaluation result of the risk degree; and
outputting a message and a countermeasure for avoiding the vulnerability, according to the risk level, wherein
the application information includes detail information of the application being executed on the server,
the detail information of the application includes an identifier of the application and detail information of the library called by the application,
the detail information of the library includes an identifier of the library and a function table in which a function called from the application is described,
the vulnerability information includes the identifier of the application and the library having the vulnerability, and vulnerability detail information in which content of the vulnerability is described,
the vulnerability detail information includes a vulnerability type determined based on the content of the vulnerability,
the evaluation method comprises:
extracting the application in which the identifier of the application included in the detail information of the application and the identifier of the application having the vulnerability included in the vulnerability information match;
generating application risk information including a first risk level indicating the risk degree from continuous execution of the extracted application, based on the vulnerability type of the vulnerability detail information corresponding to the extracted application;
extracting the library in which the identifier of the library included in the detail information of the library and the identifier of the library having the vulnerability included in the vulnerability information match;
determining whether or not the vulnerability described in the vulnerability detail information corresponding to the extracted library becomes apparent;

in the vulnerability detail information of the library, the function having the vulnerability is described as a defect function, and the evaluation method comprises:
when the defect function described in the vulnerability detail information of the extracted library is present in the function table of the detail information of the library corresponding to the extracted library, determining that the vulnerability becomes apparent;
when the vulnerability of the extracted library does not become apparent, assigning a second risk level to the extracted library;
when the vulnerability of the extracted library then becomes apparent, assigning a third risk level having a value larger than the second risk level to the extracted library; and
generating library risk information including the second risk level or the third risk level.

5. A non-transitory computer readable recording medium storing a program that causes one or more processors to execute processing comprising:
obtaining application information related to an application being executed on a server;
obtaining vulnerability information related to a vulnerability of the application and a library;
evaluating a risk degree from continuous execution of the application on the server, based on the application information, without stopping execution of the application on the server;
evaluating a risk level indicating the risk degree, based on the application information and the vulnerability information;
outputting an evaluation result of the risk degree; and
outputting a message and a countermeasure for avoiding the vulnerability, according to the risk level, wherein
the application information includes detail information of the application being executed on the server,
the detail information of the application includes an identifier of the application and detail information of the library called by the application,
the detail information of the library includes an identifier of the library and a function table in which a function called from the application is described,
the vulnerability information includes the identifier of the application and the library having the vulnerability, and vulnerability detail information in which content of the vulnerability is described,
the vulnerability detail information includes a vulnerability type determined based on the content of the vulnerability,
the processing comprises:
extracting the application in which the identifier of the application included in the detail information of the application and the identifier of the application having the vulnerability included in the vulnerability information match;
generating application risk information including a first risk level indicating the risk degree from continuous execution of the extracted application, based on the vulnerability type of the vulnerability detail information corresponding to the extracted application;

extracting the library in which the identifier of the library included in the detail information of the library and the identifier of the library having the vulnerability included in the vulnerability information match;

determining whether or not the vulnerability described in the vulnerability detail information corresponding to the extracted library becomes apparent;

in the vulnerability detail information of the library, the function having the vulnerability is described as a defect function, and the processing comprises:

when the defect function described in the vulnerability detail information of the extracted library is present in the function table of the detail information of the library corresponding to the extracted library, determining that the vulnerability becomes apparent;

when the vulnerability of the extracted library does not become apparent, assigning a second risk level to the extracted library;

when the vulnerability of the extracted library then becomes apparent, assigning a third risk level having a value larger than the second risk level to the extracted library; and generating library risk information including the second risk level or the third risk level.

* * * * *